Nov. 17, 1936.   J. R. KONETSKY   2,061,199
SPRING HANGER
Filed Sept. 28, 1934
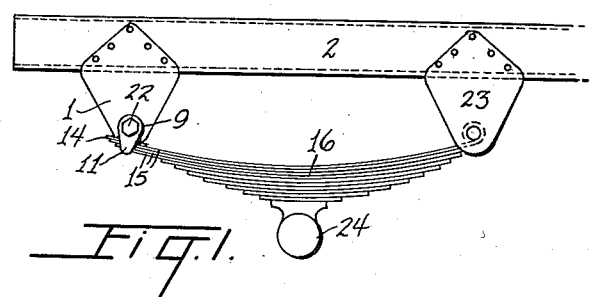
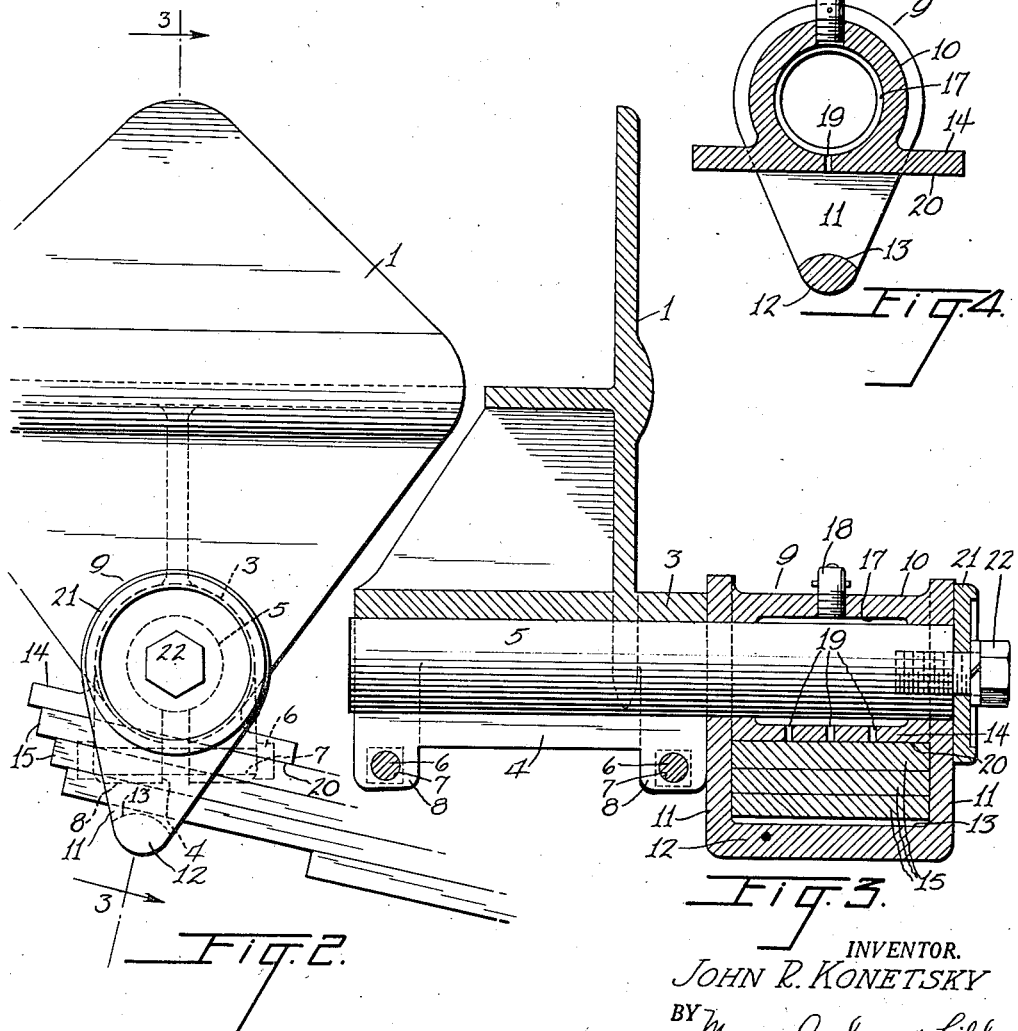
INVENTOR.
JOHN R. KONETSKY
BY Munn, Anderson + Liddy
ATTORNEYS.

Patented Nov. 17, 1936

2,061,199

UNITED STATES PATENT OFFICE 2,061,199

SPRING HANGER

John R. Konetsky, San Francisco, Calif.

Application September 28, 1934, Serial No. 745,996

4 Claims. (Cl. 267—56)

My invention relates to improvements in spring hangers, and it consists of the combinations, constructions and arrangements hereinafter described and claimed.

An object of my invention is to provide an improvement over the type of spring hanger described in my Patent No. 1,886,557 issued November 8, 1932. In the patent I show a fixed casing and this casing houses a cylindrical member which in turn rides on the uppermost leaf spring.

In the present invention I make use of a stub shaft which is preferably held against rotation, and on this stub shaft I rotatably mount a casing which has an integral bearing plate that is designed to slide on the uppermost leaf spring. The present construction is simpler than that shown in my patent.

Other objects and advantages will appear in the following specification, and the novel features of the device will be particularly pointed out in the appended claims.

My invention is illustrated in the accompanying drawing forming part of this application, in which Figure 1 is a side elevation of a portion of a truck frame showing a leaf spring and also showing my particular type of spring hanger operatively applied thereto;

Figure 2 is an enlarged end view of a spring hanger;

Figure 3 is a section along the line 3—3 of Figure 2; and

Figure 4 is a vertical section through the spring hanger casing.

In carrying out my invention I provide a bracket indicated generally at 1 which may be secured to a frame 2 of a vehicle. The bracket carries a sleeve 3 (see Figure 3) which is split longitudinally at 4 on its under side. A suitable shaft 5 is receivable in the sleeve 3 and the shaft is rigidly held in place by bolts 6 that are passed through openings 7 in lugs 8, which in turn are integral with the sleeve 3.

A casing indicated generally at 9 and of the shape shown in Figures 3 and 4 is rockably mounted on the portion of the shaft 5 that extends from the sleeve 3. The casing 9 has a cylindrical portion 10 that rotatably receives the shaft 5. Integral arms 11 depend from the cylinder 10 and are connected at their free ends by a cross piece 12 which has a curved upper surface 13 of the shape shown in Figures 2 and 4. The cylinder 10 is also provided with an integral bearing plate 14. The bearing plate 14, the sides 11 and the cross piece 12 form an opening for receiving the uppermost leaves 15 of a leaf spring 16.

The cylinder 10 is provided with an annular channel 17 for receiving a lubricant such as grease. A fitting 18 for a grease gun is mounted in the cylinder 10 and communicates with the annular channel 17. Openings 19 for the passage of grease from the channel 17 to the under surface 20 of the bearing plate 14 are provided in the cylinder 10. A certain amount of the grease will therefore pass from the channel 17 and will lubricate contacting surfaces between the bearing plate 14 and the uppermost leaf 15.

From the foregoing description of the various parts of the device, the operation thereof may be readily understood.

The casing 9 is secured in place by a washer 21 and a machine screw 22. The leaf spring 16 is not only supported by the casing 9, but Figure 1 shows its opposite end supported by a bracket 23 in the usual manner. During the vertical movement of the axle 24 the leaf spring 16 will be flexed and it will have a sliding movement with respect to the casing 9. The casing 9 will also rock on the shaft 5. The sliding movement between the bearing plate 14 and the uppermost leaf 15 is kept well lubricated in the manner just described and so is likewise the rocking of the casing 9 about the shaft 5 kept well lubricated. The device is extremely simple in construction, and is durable and efficient for the purpose intended.

While I have shown only the preferred form of my invention, it should be understood that various changes or modifications may be made within the scope of the appended claims without departing from the spirit of the invention.

I claim:

1. A spring hanger comprising a supporting shaft, a casing rockably mounted on the shaft and having a flat surfaced bearing plate disposed beneath the shaft, said bearing plate being slidably mounted upon a leaf spring end, the flat surface of the bearing plate having a sliding fit with the leaf spring throughout the width of the spring, and means encircling the leaf spring end and having a rounded surface for engaging with the underside of the leaf spring.

2. A spring hanger comprising a supporting shaft, a casing rockably carried thereby and having a bearing plate disposed beneath the shaft, integral arms carried by the casing for straddling a leaf spring end, and a cross piece integral with the lower ends of the arms and forming a leaf spring retaining opening, the spring riding against the under surface of the bearing plate, and common means for lubricating the shaft and the under surface of the bearing plate.

3. A spring mounting comprising a bracket securable to a supporting frame and having a sleeve thereon extending transversely of the frame, a shaft fixed in the sleeve and projecting therefrom and beyond the frame, a casing rockably mounted on the shaft, the casing having a bearing plate disposed beneath the shaft to slidably bear against the top of a leaf spring, arms depending from the casing to straddle the spring, and a cross piece joining the lower ends of the arms and having a rounded surface disposed to engage with the underside of the spring.

4. A spring hanger comprising a supporting shaft, a casing rockably carried thereby and supporting a bearing plate, a leaf spring retaining member cooperating with the bearing plate, the spring riding against the bearing plate, and common means for lubricating the shaft and the bearing plate.

JOHN R. KONETSKY.